July 26, 1932.  J. C. LINCOLN  1,869,015
ARC WELDING APPARATUS
Original Filed Feb. 25, 1928  3 Sheets-Sheet 1
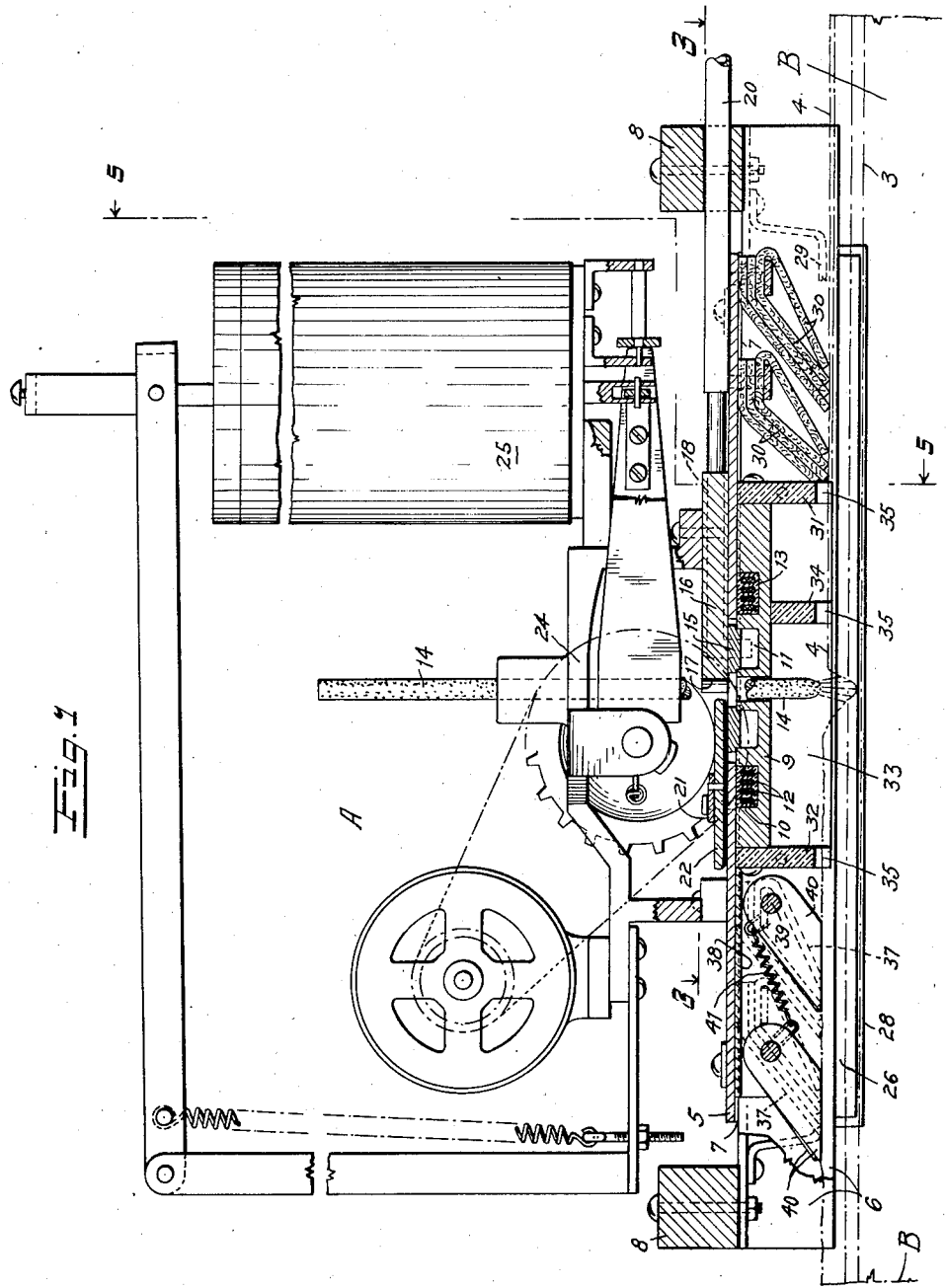
Inventor
John C. Lincoln
By his Attorney
Albert M. Austin July 26, 1932. J. C. LINCOLN 1,869,015
ARC WELDING APPARATUS
Original Filed Feb. 25, 1928  3 Sheets-Sheet 2
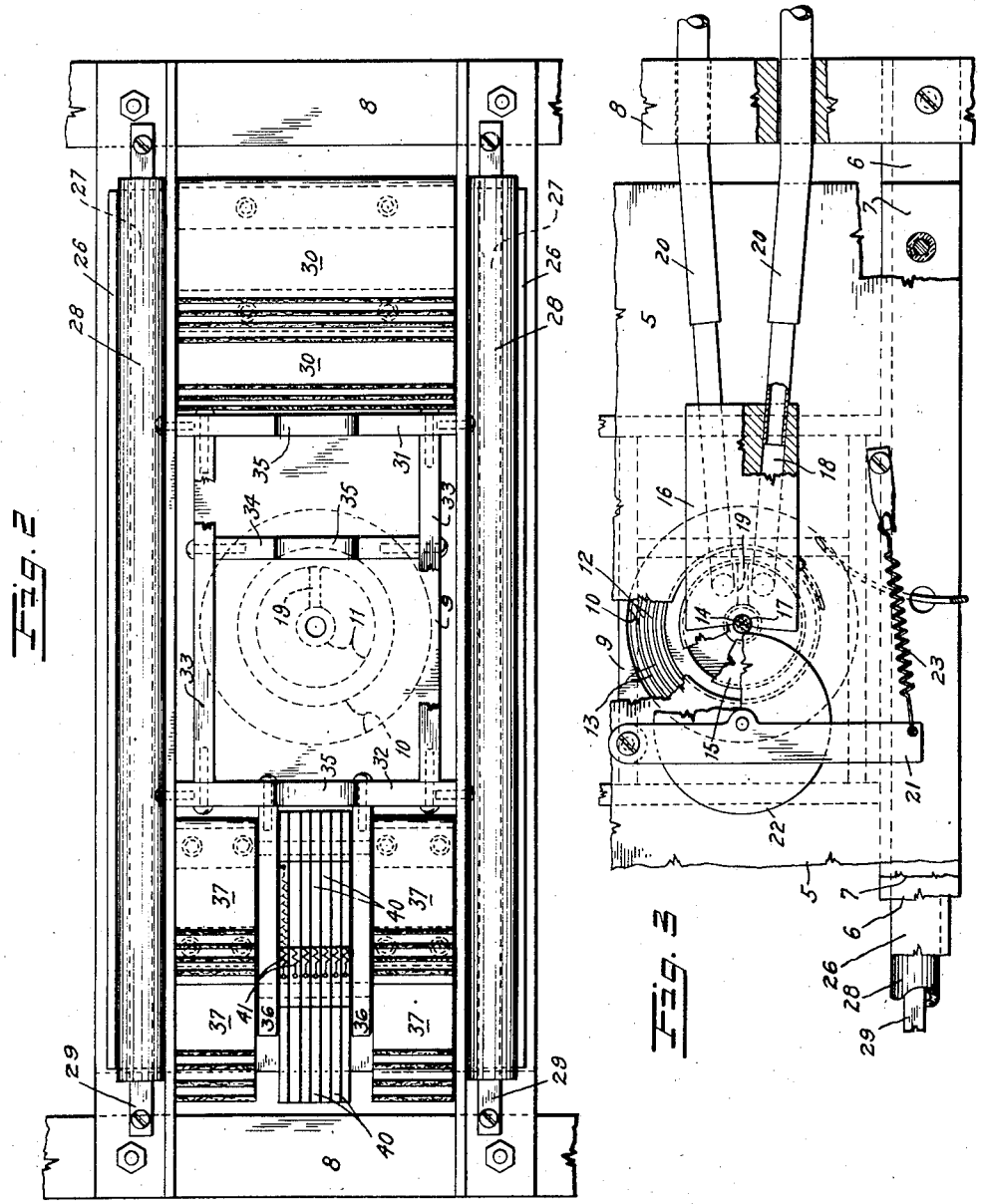
Inventor
John C. Lincoln
By his Attorney
Albert M. Austin July 26, 1932.  J. C. LINCOLN  1,869,015
ARC WELDING APPARATUS
Original Filed Feb. 25, 1928   3 Sheets-Sheet 3
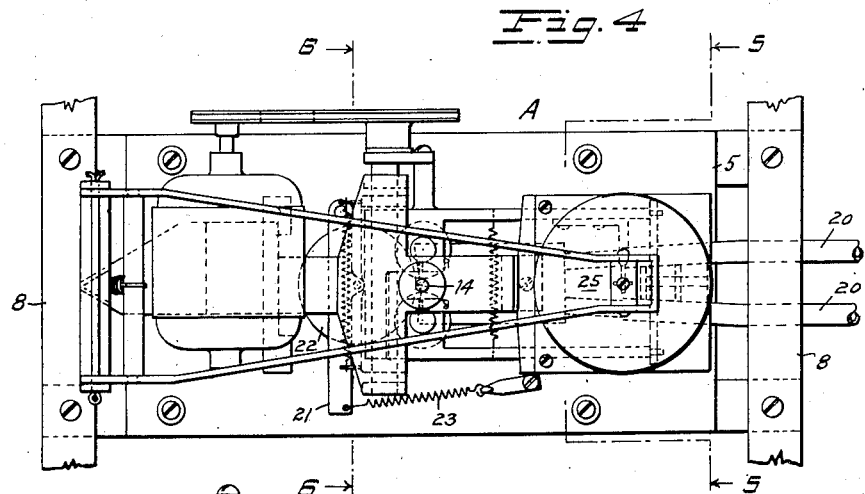
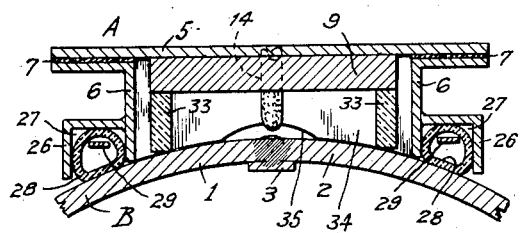
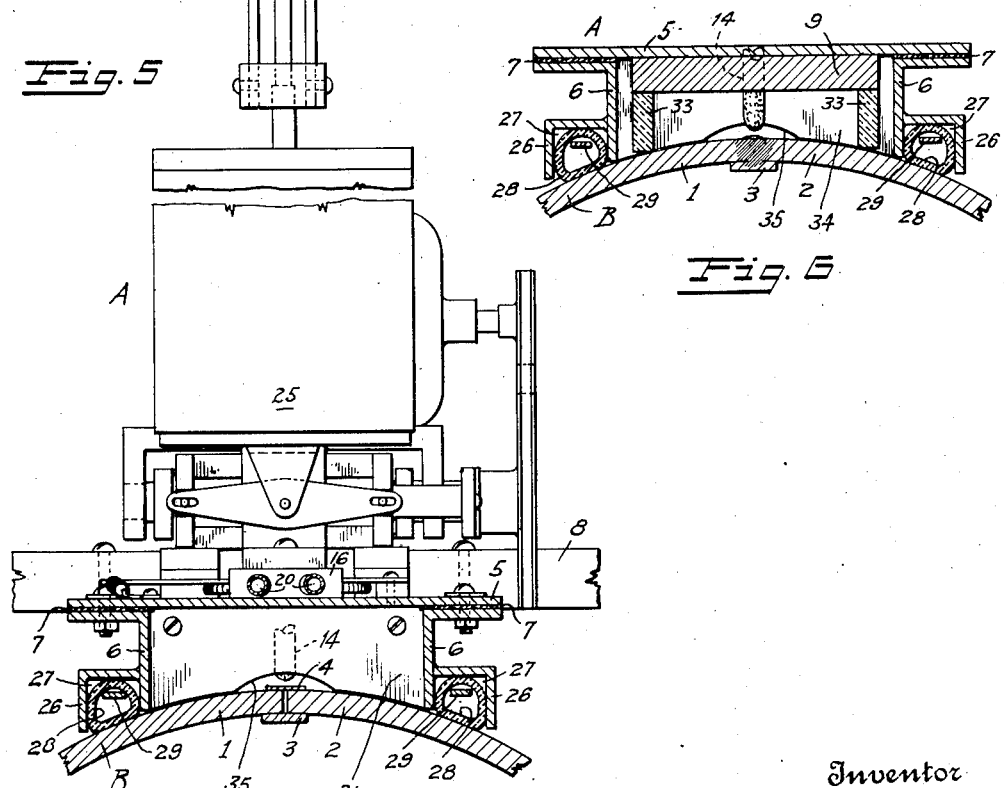

Patented July 26, 1932

1,869,015

UNITED STATES PATENT OFFICE

JOHN C. LINCOLN, OF CLEVELAND, OHIO, ASSIGNOR TO THE LINCOLN ELECTRIC COMPANY, OF CLEVELAND, OHIO, A CORPORATION OF OHIO

ARC WELDING APPARATUS

Application filed February 25, 1928. Serial No. 256,843.

The invention relates in general to the art of welding, and more particularly, to welding apparatus.

In the units or machines for arc welding it is highly desirable that air be excluded from the arc and the welding take place in a neutral atmosphere so that the weld will be tough and flexible. The housing for excluding the air should be effective even though the unit be moved over rough or uneven surfaces and it should be able to withstand the high temperature caused by the arc. It is also desirable in case the electrode for striking the arc is adjustable for feeding or other purposes to have an effective contact device for conducting the current to the electrode to prevent undue loss of energy and destruction of parts due to high contact resistance. An electromagnet for steadying the position of the arc during welding is also desirable.

According to the invention, a welding unit is provided which embodies the above desirable features and in addition has advantages which will be pointed out more in detail. The unit comprises a suitable frame including a frame plate through which the electrode extends. Suitable means may be provided above the frame plate for automatically adjusting the electrode to regulate the arc length.

The air-excluding housing surrounds the electrode and is disposed under the plate. The housing may include yieldable air-excluding outer walls so arranged as to insure a maximum of air exclusion, even though the surface of the work to be welded be irregular and interrupted. Between the outer walls and the arc, inner walls of fire resisting material may be provided to shield the outer walls from the intense heat of the arc. To provide effective current conduction to the electrode even though it be moved for feeding or other purposes, a contact block is provided having means for water cooling. This contact block has a seat for the carbon and suitable devices are provided for yieldably holding the carbon in its seat. Incorporated in the housing may be a magnet plate seating an electromagnet so positioned that its field will hold the arc substantially stationary with respect thereto.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is an elevation partly in section of a welding unit made according to the invention;

Fig. 2 is a bottom plan view of the housing;

Fig. 3 is a section on the line 3—3 of Fig. 1;

Fig. 4 is a top plan view of the unit;

Fig. 5 is a section on the line 5—5 of Fig. 1; and

Fig. 6 is a section on the line 6—6 of Fig. 4.

In the following description and in the claims parts will be identified by specific names for convenience, but they are intended to be as generic in their application to similar parts as the art will permit.

Like reference characters denote like parts in the several figures of the drawings.

Referring now to the drawings, the unit A is shown resting upon the work to be welded. The work B used for purposes of illustration is a section of a pipe made from a single steel plate rolled into a cylinder, the edges to be welded being indicated by 1 and 2. The welding unit is arranged to fit the cylindrical surface of the pipe, as shown best in Figs. 5 and 6. The seam to be welded is shown provided with an under strip 3 and an upper strip 4. The under strip may be of the same metal as the work and serves to prevent the escape of molten metal from the edges of the seam if the arc is allowed to penetrate the thickness of the work. In this case part of the under strip may be melted by the arc and caused to form a part of the finished seam. The upper strip may comprise a strip of filling metal for the purpose of increasing the cross section of the weld coated by an under layer of flux which, under the action of the arc, will help produce a highly reducing or strictly neutral atmosphere within the housing to prevent oxidation of the weld. A suitable flux is water glass or borax or any other salt having water of crystallization. A method of welding, making use of this feature, is disclosed in application Serial No. 256,839, filed February 25, 1928.

The welding unit A comprises a flat steel frame plate 5 and a pair of longitudinal angle irons 6 secured thereto but insulated therefrom by a suitable means including insulating sheets 7. Secured to the angle irons are a pair of transverse members 8 which may be used to hold the unit stationary if the pipe moves under it to weld the seam, or which may be used for moving the unit along the seam if the pipe is held stationary.

The frame plate 5 is provided with a large opening under which is secured a copper magnet plate 9. The magnet plate is provided with outer and inner concentric grooves 10 and 11. The outer groove has disposed therein the convolutions of electromagnet 12 suitably insulated from each other and from the plate 9 by insulation 13. Disposed in the opening in the frame plate 5 and passing thru the magnet plate 9 is the electrode 14 which may be made of carbon. The arc is struck between this electrode and the work. The electromagnet 12 is connected in series with the electrode 14 and the arc and is for the purpose of fixing or steadying the position of the arc relative to the magnetic field set up thereby.

The inner groove 11 is covered by a flat ring 15. Disposed above the frame plate is a contact block 16 having a circular seat 17 for the electrode 14. The contact block is provided with passageways 18 communicating with the inner groove 11 through which water may be circulated for cooling. The inner groove is provided with a wall 19 between passageways to insure circulation of the cooling medium around the groove. Suitable pipes 20 are provided for circulation of the cooling medium.

Pivoted to the frame plate 5 is a lever 21 (Fig. 3) having journalled therein a flat contact wheel 22 bearing against the electrode 14. A coil spring 23 connects the end of the lever and the frame plate to yieldably hold the contact wheel against the electrode.

The current supplied to the electrode 14 for maintaining the arc is supplied to the contact block 16. The contact block has electrical connection with the magnet plate insuring a maximum area of contact with the electrode. The contact wheel 22 presses the electrode 14 against the contact block 16 to insure minimum resistance to the large electric current necessary to maintain the arc. The cooling medium serves to prevent damage to the parts due to excess heating.

Supported by the frame plate 5 and the contact block 16 is a frame body 24 supporting the mechanism for rotating and feeding the electrode, denoted generally by 25 and described and claimed in application Serial No. 256,842, filed February 25, 1928. So far as the present application is concerned, it suffices to know that the electrode 14 is kept rotating about its own axis to insure uniform consumption thereof. At the same time the electrode is moved back and forth longitudinally to regulate the length of the arc, the longitudinal feed being controlled by the voltage across the arc to keep this voltage substantially constant.

In order to insure a maximum of air exclusion from the arc, the longitudinal angle irons 6 have secured thereto additional angle irons 26 forming longitudinal channels 27. Disposed in these channels are rubber tubes 28 having strips 29 therein fastened to the longitudinal angle irons 6 at the ends of the tubes.

Two sets of front wipers 30 are provided, secured to the frame plate 5 and extending between the longitudinal members 6. These wipers may be made of layers of any sheet, flexible, fire-resisting material, such as asbestos. A transverse refractory wall 31 is provided extending just in back of the front wipers and secured to the magnet plate 9. At the rear end of the magnet plate is another transverse refractory wall 32 also secured thereto.

On either side of the electrode is a longitudinal refractory wall 33 secured to transverse walls 31 and 32 and spaced from and protecting the longitudinal members 6. A transverse refractory wall 34 is provided just in front of the arc secured to walls 33.

It will be noted that each of the transverse refractory walls is provided with a central notch 35. The notches in the transverse walls 31 and 34 are for the purpose of clearing the upper strip 4 while the notch in the transverse wall 32 is for the purpose of clearing the finished seam.

Extending rearwardly from the transverse refractory wall 32 is a pair of longitudinal refractory walls 36 on either side of the seam. Two sets 37 of asbestos wipers are provided between the refractory walls 36 and the longitudinal members 6. Between the refractory walls 36 is a longitudinal U-shaped member 38 having a pair of pivot rods 39 therein. On each pivot rod is a stack of flat plates 40 of fire resisting material such as lava, each front plate and each back plate being connected by a coil spring 41 to yieldably hold these plates against the work. It will be seen that these plate wipers 40 effectively seal the housing against the admission of air over the ridge of the finished weld.

In operation, the work B may be moved under the stationary unit A to weld the seam, or the unit A may be moved over the stationary work. In either case the unit rests on the work so as to insure a maximum of contact between the several sealing devices and the work. The flexible front wipers 30 fit over the work and the upper welding strip 4 and maintain an effective air seal at this point. At the rear of the unit the flexible back wipers 37 and the plate wipers 40 taking up irregularities in the finished seam effectively prevent ingress of air. The rubber tubing 28 on the longitudinal members effectively seals the housing at these points. Immediately surrounding the electrode 14 are provided the lava walls 31, 32, 33 and 34 which are best able to withstand the tremendous heat, and which protect the outer air sealing walls 28, 30, 37 and 40 from the heat.

Thus it will be seen a welding unit has been provided having a housing which will effectively exclude air even though moved over uneven surfaces. It is built ruggedly and to withstand high temperatures. The inherent construction is such that the unit will give satisfactory service during a long life. The current contact devices insure that the large current necessary to maintain the arc is conducted to the carbon electrode even though the carbon is continuously moving, and the cooling means insures that the parts will not deteriorate due to the great heat caused by the high resistance of the joint and by the arc itself. Furthermore, the provision of the magnet plate assists in the conduction of current to the electrode and provides a seat for the electromagnet. The electromagnet is so positioned and the magnetic current is so arranged that the arc will be held steady and stationary with respect to the magnetic field, thus improving the character of the weld. The effective exclusion of air from the arc together with the action of the flux aids materially in providing a most satisfactory weld.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a welding unit, a frame plate, longitudinal members depending therefrom having channels in their lower edges, soft tubes in said channels, strips in said tubes secured to said members, a plurality of sets of transverse front, soft, flexible, fireproof wipers connecting said members, a transverse refractory wall just behind said wipers, an electrode extending through said plate behind said wall, a transverse refractory wall behind said electrode, longitudinal refractory walls connecting said transverse walls, a transverse wall connecting said longitudinal walls in front of said electrode, longitudinal rear, refractory walls for positioning on opposite sides of the seam a plurality of sets of sheet, wipers, each set being pivoted between said rear walls, a plurality of sets of transverse, rear, soft, flexible fireproof wipers between said rear longitudinal walls and said longitudinal members on each side, said transverse walls having notches for positioning over the seam.

2. In a welding unit, a frame plate, longitudinal members depending therefrom having channels in their lower edges, soft material in said channels, a transverse, front, soft, flexible fireproof wiper connecting said members, a transverse refractory wall just behind said wipers, an electrode extending through said plate behind said wall, a transverse refractory wall behind said electrode, longitudinal refractory walls between said transverse walls, longitudinal, rear refractory walls for positioning on opposite sides of the seam, a set of sheet, wipers pivoted between said rear walls, a transverse, rear, soft, flexible fireproof wiper between said rear longitudinal walls and said longitudinal members on each side, said transverse walls having notches for positioning over the seam.

3. In a welding unit adapted to be moved relatively to the work and along an irregular surface thereof, means for producing welding heat at the welding point on said work, a housing surrounding said welding point and comprising an outer air-excluding wall yieldable to take up the irregularities on the surface of the work, and an inner fire-resisting wall spaced from and protecting the outer wall from the welding heat.

4. In a welding unit adapted to be moved relatively to the work along a surface having a ridge, a housing in which the welding action takes place including first and second transverse pivot rods, a set of wipers pivoted to each rod, each set comprising a stack of sheets extending backwardly and having their edges engage the work in the direction of relative movement of said housing and work, and separate springs each connecting one sheet of the back set to the opposed sheet of the front set to yieldingly hold said wipers against the work.

5. In a welding unit adapted to be moved relatively to the work along a surface having a ridge, a housing in which the welding action takes place including a transverse pivot rod, a set of wipers pivoted to said rod, said set comprising a stack of sheets extending backwardly and having their edges engage the work in the direction of relative movement of said housing and work, and means for independently and yieldingly holding each sheet against the work.

6. In a welding unit adapted to be moved relatively to the work along an uneven surface, a housing in which the welding action takes place including a set of wipers comprising a stack of sheets extending backwardly and having their edges engage the work in the direction of relative movement of said housing and work, means for pivotally mounting said wipers in said housing and means for yieldingly and independently holding each wiper against the work.

7. In a welding unit adapted to be moved relatively to the work along an uneven surface, a housing in which the welding action takes place including a stack of wiper sheets, and means for independently and yieldingly holding each sheet against the work.

8. In a system of arc welding, a welding unit comprising a magnet plate having a hole and two passageways surrounding said hole, an electromagnet in one of said passageways, an electrode in said hole, and means for conducting cooling medium to said other passageway.

9. In a system of arc welding, a welding unit comprising a magnet plate having a hole and an annular groove surounding said hole, an electrode in said hole for striking an arc and an electromagnet disposed in said groove for steadying said arc.

10. In a welding unit a frame plate, a magnet plate secured to said frame plate having a hole and concentric passages, an electrode in said opening, an electromagnet in the outer passage, a contact block having a seat for said electrode, said block having conduits communicating with said inner passage for the circulation of cooling medium, means for yieldingly holding said electrode in said seat, means for conveying current to said block, and means for feeding said electrode.

11. In a welding unit a frame plate having an opening, a magnet plate on the under side of said frame plate having a hole and concentric grooves, an electrode in said opening and hole, an electromagnet in the outer groove, a ring closing the inner groove, a contact block having a notch for said electrode, said block having conduits communicating with said inner groove for the circulation of cooling medium, a lever pivoted to said frame plate, a contact wheel journaled on said lever, a spring connecting said lever and frame plate for urging said wheel against said electrode, means for conveying current to said block, and means for rotating said electrode.

12. In a welding unit adapted to be placed over the work to be welded, a carbon electrode, an air-excluding housing adapted to be placed over the work and to exclude air from the arc, means for producing a reducing atmosphere within said housing and means for automatically maintaining the voltage across said arc substantially constant.

13. In a system of arc welding, a welding unit comprising a carbon electrode adapted to have an arc drawn between it and the work, a single electromagnet coil of relatively small height on the same side of the work only as said electrode and surrounding said electrode, said electromagnet being greatly spaced from said electrode and also greatly spaced above the arc as compared to its small axial dimension.

14. In a welding unit, a frame, an electrode positioned in said frame, a contact device having a notch seating said electrode and conducting electricity thereto, means for circulating cooling medium through said device, and means for yieldably holding said electrode against said notch so that good electrical contact is always made therewith, and means for moving said electrode relative to said contact device.

15. In a system of arc welding, a welding unit comprising an electrode adapted to have an arc of heavy current drawn between it and the work, a single electromagnet on the same side of the work only as said electrode and surrounding said electrode, said electromagnet comprising a relatively few turns of heavy conductor and connected in series with said electrode to carry substantially all of the welding current, and means for excluding the air from the space around the arc.

16. In a system of arc welding, a welding unit comprising an electrode adapted to have an arc drawn between it and the work, a single solenoid on the same side of the work as the electrode and surrounding said electrode for the purpose of steadying the arc, and means for automatically feeding said electrode in such manner as to hold the voltage between said electrode and the work substantially constant.

17. In a welding unit, an electrode adapted to have an arc drawn between it and the work, an air-excluding housing adapted to be placed around the welding point, and means for feeding said electrode in such manner that the voltage between said electrode and the work is kept substantially constant.

18. In a unitary portable welding unit, an air-excluding housing adapted to fit over the work about the welding point, an electrode passing through said housing and adapted to draw an arc with the work, an electrode feeding device disposed adjacent the outside of said housing to feed said electrode in such manner as to keep the voltage across the arc substantially constant.

19. In a welding unit adapted to be moved relatively to the work along the surface thereof, means for producing a welding heat at the welding point, a housing including walls of refractory material surrounding the welding point, and outer air-excluding walls surrounding and spaced from said first walls to form an air space therebetween.

20. In a system of arc welding, a welding unit comprising an electrode adapted to have an arc of heavy current drawn between it and the work, a single electromagnet on the same side of the work only as the electrode and surrounding said electrode to steady the arc, said electromagnet comprising a relatively few turns of heavy conductor and being connected in series with said electrode and the source of power to carry substantially all the welding current and means for holding the voltage between said electrode and work constant.

In testimony whereof I have hereunto set my hand.

JOHN C. LINCOLN.